Figure 1:
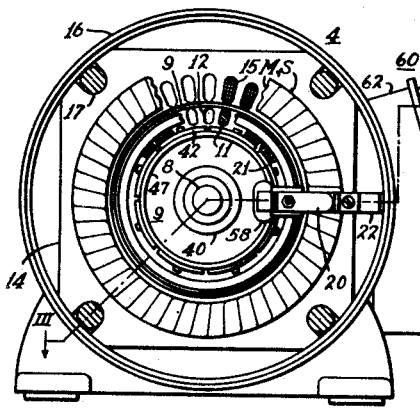

Oct. 11, 1949.                J. M. STEIN ET AL                2,484,254
                    CENTRIFUGAL SWITCH FOR SINGLE-PHASE MOTORS
                              Filed Aug. 28, 1947

WITNESSES:
Edward Michaels
Nw. C. Groome

INVENTORS
Joseph M. Stein &
John R. Greenemeyer.
BY
O. D. Buchanan
ATTORNEY

Patented Oct. 11, 1949

2,484,254

UNITED STATES PATENT OFFICE 2,484,254

CENTRIFUGAL SWITCH FOR SINGLE-PHASE MOTORS

Joseph M. Stein, Buffalo, and John R. Greenemeyer, Eggertsville, N. Y., assignors to Westinghouse Electric Corporation, East Pittsburgh, Pa., a corporation of Pennsylvania Application August 28, 1947, Serial No. 771,042

6 Claims. (Cl. 200—80)

Our invention relates to centrifugal switches and to special mounting-means therefor, which have special significance in connection with a single-phase induction-motor in which the switch is used, as will be subsequently pointed out.

Our invention relates to the single-phase part of a new, entirely redesigned line of general-purpose squirrel-cage motors which have been specially designed for convertibility of the motor-frames, so that a minimum number of parts have to be changed in order to convert to or from the different types of protected machines, such as drip-proof, splash-proof, totally enclosed, and the like, as covered in an application of Ludwig et al., Serial No. 690,628, filed August 15, 1946, and assigned to the Westinghouse Electric Corporation.

An object of our invention is to provide a line of convertible single-phase motors which use, as far as possible, the same frame-parts and the same stator-punchings as are used in the corresponding line of polyphase motors. We have succeeded in using the same frames, brackets, and stator-punchings as are used in the polyphase motors, but some of our single-phase motors require rotor-punchings which are different from those which are used in the polyphase line. In addition to the parts which are used on polyphase motors, a single-phase motor requires a centrifugal switch, an electrolytic capacitor or capacitors, and sometimes a thermal protective device of either the manual-reset or automatic type.

An object of our present invention is to provide a centrifugal switch in a motor in which the end-brackets can be removed, without disturbing the terminal motor-connections, without disturbing the calibration or adjustment of the centrifugal switch, and without requiring any restrictions with regard to the normal end-play in the assembled motor.

A further object of our invention is to provide a centrifugal switch of the radial-expansion type, as distinguished from the axial-expansion type, thereby obtaining several important advantages, including the avoidance of the necessity for accurately shimmed axial displacements between the stationary and rotating parts, which are necessary in axial-expansion switches, and also obtaining the advantages of a better control, and an inherently greater accuracy, in meeting the required tolerances by means of radial machining, as compared with axial machining.

A further object of our invention relates to a novel centrifugal-switch design in which the simplicity of the parts and the ease of assembly of the parts are greatly stressed, including the use of a single spring which eliminates the necessity of matching two or more springs, the use of a garter-type spring which reduces spring-stresses, and the elimination of the necessity for guiding the movable parts of the switch on the shaft or on auxiliary slide-rails.

And finally, but by no means least, it is an object of our invention to provide a radial-expansion centrifugal-switch, having a pivoted contact-making-and-breaking switch-part which is carried by a mounting-bar which is supported directly by the stator-frame, as distinguished from being supported from the removable end-bell or bracket within which the switch is mounted. This is an important feature, in that it permits the end-bracket to be removed, either for the purpose of servicing the motor, or for the purpose of making a change so as to convert the motor to a different type of protected machine, without disturbing either the setting of the centrifugal switch or the motor-terminal connections which are associated with the switch-contacts.

Figure 2:
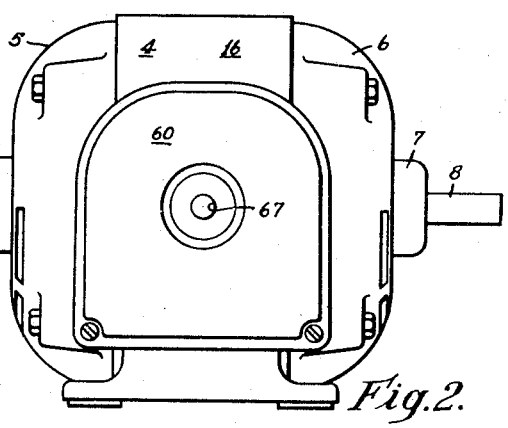
Figure 3:
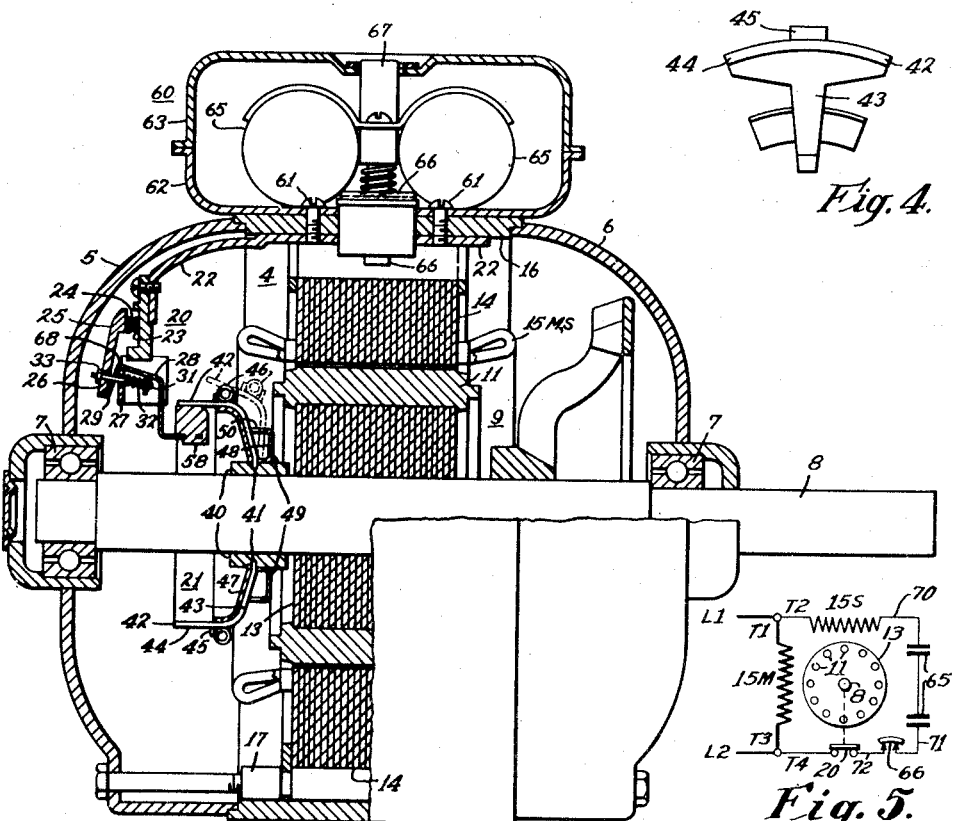
Figure 4:
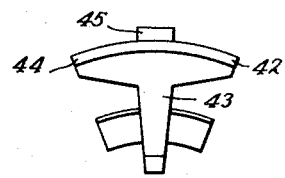
Figure 5:
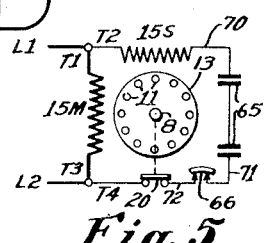

With the foregoing and other objects in view, our invention consists in the dynamo-electric machines, combinations, assemblies, parts, structures, and the methods of design and operation hereinafter described and claimed, and illustrated in the accompanying drawing, wherein:

Figure 1 is an end-elevation of a one H. P. four-pole, 1740 R. P. M., induction-run capacitor-motor, embodying our invention by way of illustration, with the front end-bracket removed, and with some parts broken away to show the internal construction, Fig. 2 is a side elevation of the same motor, Fig. 3 is a horizontal longitudinal sectional view of the motor, on a slightly larger scale, the section-plane being indicated approximately by the line III—III in Fig. 1, Fig. 4 is a detail-view of one the segmental weight-members, and Fig. 5 is a diagram of the motor circuit-connections.

As shown in the drawing, our invention is illustrated as being applied to a single-phase capacitor-start induction-motor, having a stationary primary member 4 having removable front and rear end-brackets 5 and 6 at the respective ends thereof. Each end-bracket has a centrally disposed bearing 7, which supports the shaft 8 which carries the rotor-member 9 at an intermediate point on the shaft, between the two bearings 7. The rotor-member 9 is a squirrel-cage member, having an aluminum squirrel-cage winding 11, cast integrally within the slots 12 of the rotor-core 13. The stationary primary member 4 has a stator-core 14 which carries main and starting windings 15M and 15S.

It will be noted that the stator-core 14 is made with square punchings having rounded corners, thus providing four axially extending ventilating-spaces between the flat sides of the primary-punchings 14 and the cylindrical stator-frame 16. This is in accordance with the previously mentioned Ludwig et al. application on the convertible feature. It is also noted that the rounded corners of the stator-punchings 14 are held by a locking-bar assembly 17, which is more specifically described and claimed in an application of Goodwin et al., Serial No. 690,629, filed August 15, 1946, Patent 2,447,645, issued August 24, 1948, and assigned to the Westinghouse Electric Corporation.

In accordance with our invention, we provide a centrifugal-switch device comprising a stationarily supported pivoted contact-making-and-breaking switch 20, and a radially expansible centrifugal device 21. The switch 20 is disposed inside of, and adjacent to, the front end-bracket 5, and it is carried by a mounting-bar 22 which is connected to the stator-frame 16, preferably extending in one of the axial ventilating-spaces between the frame and one of the flat sides of the stator-core 14. The centrifugal device 21 is mounted on the shaft 8, between the switch 20 and the front end of the rotor-core 13.

The switch 20 has a stationary contact 23 and a movable contact 24, the latter being carried by a movable contact-arm 25 having a perforated, approximately flat, rear end 26. The switch-mounting part of the mounting-bar 22 comprises a perforated, approximately flat mounting-piece 27 which is spaced from the shaft 8, in a plane which is approximately normal to the shaft. The switch is provided with an operating-handle 28 having a bent, perforated, approximately flat, rear end 29 which overhangs the mounting-piece 27 and is disposed between the outer face of said mounting-piece and the flat rear end 26 of the contact-arm 25. The switch is further provided with a suitable spring-means for biasing it toward its open position, this spring-means being illustrated in the form of a doubly headed pin 31 which extends through the perforations in the contact-arm 25, the handle 28, and the mounting-piece 27, respectively, the inner end of said pin being encircled by a compression-spring 32 which abuts against the inner face of the mounting-piece 27. The head at the outer end of the pin 31 is preferably in the form of a nut 33, for convenience in assembly, and for providing a means whereby the pressure of the compression-spring 32 may be adjusted.

The centrifugal device 21 comprises a hub 40 which is mounted on the shaft 8. This hub is preferably provided, in its outer cylindrical surface, with an annular groove 41, which provides a pivotal mounting-seat for the inner ends of a plurality of bent segmental devices 42, which are conveniently stamped out of sheet-metal. Each of these bent segmental devices 42 has a nearly radially extending rear end 43, which is pivotally seated in the groove 41, and a nearly cylindrical-segmental front end 44. On a rear part of its cylindrical-segmental front end 44, each of the bent segmental devices 42 is provided with outwardly projecting garter-spring retaining tabs 45, which may be conveniently provided by struck-out portions of the sheet-metal blank from which the bent segmental device 42 is made. A garter-spring 46 encircles all of the segmental devices, in a position which is retained by said tabs 45. The several segmental devices 42 are all closely spaced from each other, and their front ends 44 together make a substantially complete, approximately cylindrical annular member which is expansible and contractible.

In the non-responsive state of the centrifugal device 21, as shown in full lines in Fig. 3, the cylindrical-segmental front ends 44 of the several segmental devices 42 are close together, almost in contact with each other; but when the centrifugal device responds to the speed of rotation of the shaft 8, these cylindrical-segmental front ends 44 fly outwardly, against the force of the garter-spring 46, thus in effect providing an expanded annular surface or member, with greater circumferential spacings between the adjacent segments which make up the complete cylindrical surface of the expanded front end of the centrifugal device 21.

Any suitable means may be provided for guiding and retaining the bent segmental weight-devices 42 of the centrifugal device 21. A desirable structure is shown in Fig. 3, wherein a bell-shaped abutment 47 is mounted on the hub 40 in front of the annular groove 41, to provide an inner abutment or support for the bent segmental devices 42 in the non-responsive state of the centrifugal device 21. A guard 48, which may be pressed out of sheet-metal, is also mounted on the hub 40, being disposed back of the annular groove 41, and being welded to the hub, as shown at 49, this guard 48 being provided with slots or notches 50 for individually guiding the several bent segmental devices 42, and for providing a stop which limits the extreme outward movement of the segmental devices, in response to centrifugal force, as indicated by dotted lines in Fig. 3.

The operating-handle 28 of the switch 20 extends inwardly, in a generally axial direction, toward the centrifugal device 21. The front or handle-end of this operating-handle 28 is this inner end, which projects within the expansible and contractible annular member which is collectively provided by the cylindrical-segmental front ends 44 of the plurality of segmental devices 42. This front or inner end of the operating-handle 28 is provided with a head 58, having a rounded outer surface for engagement with the inner surfaces of the cylindrical-segmental front ends 44 of the respective segmental devices 42 of the centrifugal device 21.

As more specifically described and claimed in a companion-application of J. M. Stein and R. W. Egglestone, Serial No. 771,043, filed August 28, 1947, we provide an enlarged conduit-box 60 which is mounted on one side of the motor, being secured to the cylindrical outer surface of the stator-frame 16 by means of mounting-screws 61. Preferably, these mounting-screws 61 are the same screws which are utilized to secure the mounting-bar 22 to the inner cylindrical surface of the stator-frame 16, so that the stationary switch-part 20 of the centrifugal-switch assembly, and the conduit-box 60, are both secured by the same mounting-screws 61. The conduit-box 60 is preferably made in two parts, namely a base 62 and a top 63, and is of sheet-metal construction. In addition to its normal function of providing a housing for the various terminal-connections involving the incoming leads and the various motor-terminals, the enlarged conduit-box 60 is also utilized to provide a housing for two electrolytic capacitors 65, and it may also be used, in thermally protected motors, as the housing or mounting-place for a suitable thermal protector 66 of whatever type may be desired for protecting the motor against excessive temperatures. The illustrated thermal-protector 66 is of a manual-reset type, having a reset-button 67 which is accessible from the front of the conduit-box.

An example of the nature of the terminal-connections which may be made in our conduit-box is shown diagrammatically in Fig. 5, wherein the main winding 15M, the starting-winding 15S, the rotor-parts including the shaft 8, squirrel-cage 11 and rotor-core 13, and the centrifugal switch 20, are the only parts which are not in the conduit-box 60. The two leads L1 and L2 of the single-phase supply-line are shown, in Fig. 5, as they enter the conduit-box. The supply-lead L1 is connected to the terminal-lead T1 of the main winding 15M and to the terminal-lead T2 of the starting-winding 15S. The other starting-winding terminal 70 is connected to the two serially connected capacitors 65, which are connected at 71 to the thermal-protector contacts 66, from which the circuit continues, through a conductor 72 to one terminal of the centrifugal switch 20, the other terminal of which is the motor-terminal T4. The second supply-lead L2 is connected to the terminal T3 of the main winding 15M and to the motor-terminal T4 which is the second terminal of the starting-winding circuit.

In operation, when the motor is at a standstill, or when the motor-speed is low, the centrifugal device 21 is in its non-responsive condition, as shown in full lines in Fig. 3, being held in this position by the garter-spring 46. Under these conditions, one or more of the cylindrical-segmental front ends 44 of the segmental weight-devices 42 press the switch-lever or operating-handle 28 down, that is, in toward the shaft, holding said lever or handle in this position, against the pressure of the switch-spring 32, and thus holding the switch-contacts closed. In this position of the parts, it will be noted that the switch-handle 28 has been moved further down, or toward the shaft, than is necessary to move the contact-arm 25 to its closed position, so that a wedge-shaped space 68 is opened up between the rear end 26 of the contact-arm 25 and the rear end 29 of the operating-handle 28, thus causing the compression-spring 32 of the switch to hold the movable contact 24, with a firm yieldable pressure, against the stationary contact 23, while at the same time tending to move the switch-handle 28 to its outward position, further away from the shaft 8, corresponding to the open position of the switch. In general, the force of the switch-spring 32, which is effective to tend to move the handle-head 58 outwardly, is small relative to the effective force of the garter-spring 46 in holding the centrifugal device in its non-responsive condition.

During the accelerating period when the motor is starting, the centrifugal device 21 responds to a certain predetermined speed of the shaft. At this response-speed, the centrifugal force operating on the cylindrical-segmental front ends 44 of the bent segmental weight-devices 42 overcomes the pressure of the garter-spring 46, which is off-center with respect to the pivot-groove 41 of the segmental devices 42. The segmental devices 42 thereupon fly outwardly under centrifugal force, with the off-center moment-arm of the garter-spring becoming less and less, until the segmental devices 42 reach the limit of their outward travel, as determined by the guard 48, as shown in dotted lines in Fig. 3. In this centrifugally responsive position of the centrifugal device, the garter-spring 46 is still off-center, but only slightly off-center, so that it has a relatively small moment-arm tending to retain the centrifugal device to its responsive condition. This change in the effective moment-arm of the garter-spring 46 is useful in making the centrifugal device 21 respond with a positive snap-action.

When the centrifugal device 21 has thus responded, the cylindrical-segmental front ends 44 of the several segmental weights 42 are in their dotted-line outward position, as shown in Fig. 3, and in this position they are altogether out of contact with the head 58 on the switch-handle 28, and the switch-contact arm 25 is held in its open position by the switch-spring 32.

Since our centrifugal switch is of the radial-expansion type, that is, since it responds to a radial movement of the switch-lever or handle 28, our device is not at all sensitive to the relative axial positions of the stator-borne and rotor-borne parts of the centrifugal-switch assembly, the only requirement being that the switch-handle 28 shall extend in or under the expansible and contractible annular portion of the centrifugal device 21.

From the standpoint of serving the basic requirements of the entire new line of general-purpose induction-motors, of which the present invention is a part, it is important to note that our stator-borne switch-element 20 is supported by a mounting-bar 22 which is supported by the primary member 4, as distinguished from being supported from the removable front end-bracket 5 within which the switch is located. Specifically and preferably, the mounting-bar 22 of the switch is held in place by the same mounting-screws 61 which hold the conduit-box 60, thus minimizing the motor-cost to the greatest extent possible. The mounting of the stationary switch-part 20 on the stator-frame 16, rather than on the bracket 5, leaves the motor-designer and the motor-purchaser both free to remove or attach the end-bracket at will, in the processes of motor-manufacture or motor-maintenance, without disturbing the centrifugal switch in the least. It also leaves, unimpeded, the convertibility-feature of the motor-frame assembly, whereby different types of protected machines may be provided, using the same common parts for all types, so far as practicable, as covered in the previously mentioned Ludwig et al. application.

While we have illustrated our invention in connection with one particular size and kind of motor, and in accordance with a preferred structural form of the centrifugal-switch assembly, we wish it to be understood that our invention is not limited to the precise details which have been chosen for illustration. We desire, therefore, that the appended claims shall be accorded the broadest construction consistent with their language.

We claim as our invention:

1. A centrifugal-switch device for operating in response to the speed of a rotating shaft, comprising a pivoted contact-making-and-breaking switch, a stationarily supported mounting-bar for pivotally supporting said switch, said switch having spring-means for biasing it toward its open position and having an operating-handle which is movable toward and away from said shaft, the switch being open when the handle is away from the shaft, and a radially expansible centrifugal device carried by the shaft and having, in effect, an expansible and contractible annular member which surrounds said handle and closes said switch in the contracted condition of said member, said member being in its expanded condition in its centrifugally responsive state and being out of contact with said handle in this state.

2. The invention as defined in claim 1, characterized by said switch comprising a movable contact-arm having a perforated, approximately flat, rear end, the switch-mounting part of said mounting-bar comprising a perforated, approximately flat mounting-piece spaced from the shaft in a plane approximately normal to the shaft, said operating-handle having a bent, perforated, approximately flat, rear end which overhangs said mounting-piece and is disposed between the outer face of said mounting-piece and the flat end of the contact-arm, and said spring-means comprising a doubly headed pin extending through the perforations in said contact-arm, handle, and mounting-piece, and a compression spring encircling said pin and abutting the inner face of said mounting-piece.

3. The invention as defined in claim 1, characterized by said radially expansible centrifugal device comprising a hub mounted on the shaft, a plurality of bent segmental devices each having a nearly radially extending rear end pivotally engaging the hub, each having a nearly cylindrical-segmental front end, and each further having outwardly projecting garter-spring-retaining tabs on a rear part of its cylindrical-segmental front end, and a garter-spring encircling all of the segmental devices in a position retained by said tabs, said segmental devices being closely spaced from each other, and their front ends making a substantially complete, approximately cylindrical annular member, in the non-responsive state of the device, and said front ends being outwardly movable in the centrifugally responsive state of the device.

4. The invention as defined in claim 1, characterized by said switch comprising a movable contact-arm having a perforated, approximately flat, rear end, the switch-mounting part of said mounting-bar comprising a perforated, approximately flat mounting-piece spaced from the shaft in a plane approximately normal to the shaft, said operating-handle having a bent, perforated, approximately flat, rear end which overhangs said mounting-piece and is disposed between the outer face of said mounting-piece and the flat end of the contact-arm, and said spring-means comprising a doubly headed pin extending through the perforations in said contact-pin, handle, and mounting-piece, and a compression spring encircling said pin and abutting the inner face of said mounting piece; said invention being further characterized by said radially expansible centrifugal device comprising a hub mounted on the shaft, a plurality of bent segmental devices each having a nearly radially extending rear end pivotally engaging the hub, each having a nearly cylindrical-segmental front end, and each further having outwardly projecting garter-spring-retaining tabs on a rear part of its cylindrical-segmental front end, and a garter-spring encircling all of the segmental devices in a position retained by said tabs, said segmental devices being closely spaced from each other, and their front ends making a substantially complete, approximately cylindrical annular member in the non-responsive state of the device, and said front ends being outwardly movable in the centrifugally responsive state of the device.

5. A pivoted contact-making-and-breaking switch comprising a movable contact-arm having a perforated, approximately flat, rear end, a stationarily supported mounting-bar for pivotally supporting said switch, the switch-mounting part of said mounting-bar comprising a perforated, approximately flat mounting-piece, said switch having spring-means for biasing it toward its open position and having an operating-handle, said operating-handle having a bent, perforated, approximately flat, rear end which overhangs said mounting-piece and is disposed between the outer face of said mounting-piece and the flat end of the contact-arm, and said spring-means comprising a doubly headed pin extending through the perforations in said contact-arm, handle, and mounting-piece, and a compression spring encircling said pin and abutting the inner face of said mounting-piece.

6. A radially expansible centrifugal device for operating in response to the speed of a rotating shaft, comprising a hub mounted on the shaft, a plurality of bent segmental devices each having a nearly radially extending rear end pivotally engaging the hub, each having a nearly cylindrical-segmental front end, and each further having outwardly projecting garter-spring-retaining tabs on a rear part of its cylindrical-segmental front end, and a garter-spring encircling all of the segmental devices in a position retained by said tabs, said segmental devices being closely spaced from each other, and their front ends making a substantially complete, approximately cylindrical annular member, in the non-responsive state of the device, and said front ends being outwardly movable in the centrifugally responsive state of the device.

JOSEPH M. STEIN.
JOHN R. GREENEMEYER.

REFERENCES CITED

The following references are of record in the file of this patent:

UNITED STATES PATENTS

| Number | Name | Date |
|---|---|---|
| 844,384 | Meston et al. | Feb. 19, 1907 |
| 873,815 | Wiard | Dec. 17, 1907 |
| 1,022,904 | Webster | Apr. 9, 1912 |
| 1,551,794 | Brockmeyer et al. | Sept. 1, 1925 |
| 1,926,339 | Kindl et al. | Sept. 12, 1933 |
| 2,032,349 | Albert | Mar. 3, 1936 |
| 2,054,479 | Hoddy | Sept. 15, 1936 |